Jan. 2, 1940.   M. W. KENNEY ET AL   2,185,407
SELECTIVELY OPERABLE AUTOMATIC ADJUSTING MEANS
Filed Sept. 10, 1936   2 Sheets-Sheet 1
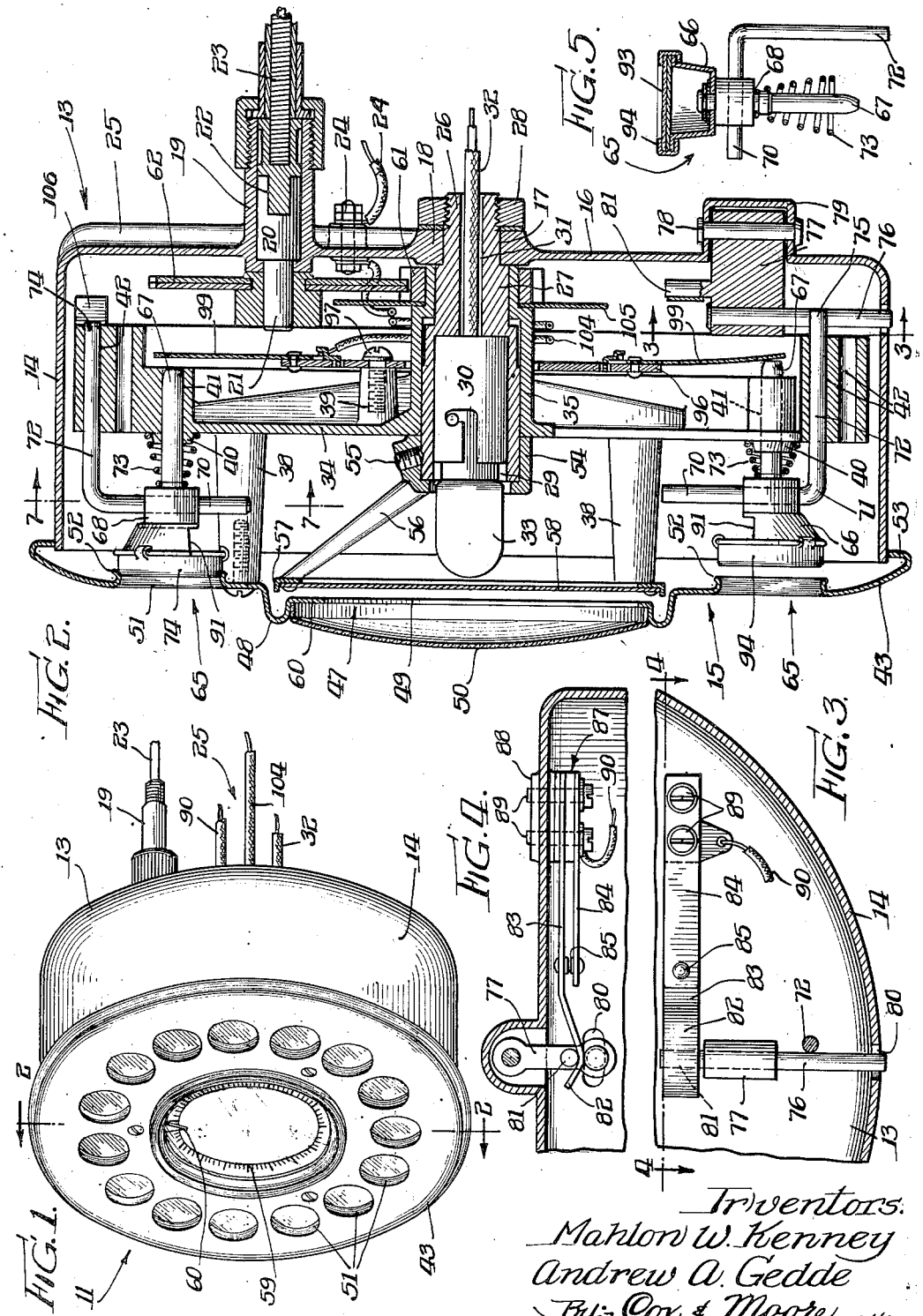
Inventors:
Mahlon W. Kenney
Andrew A. Gedde
By: Cox & Moore attys Jan. 2, 1940.  M. W. KENNEY ET AL  2,185,407
SELECTIVELY OPERABLE AUTOMATIC ADJUSTING MEANS
Filed Sept. 10, 1936  2 Sheets-Sheet 2
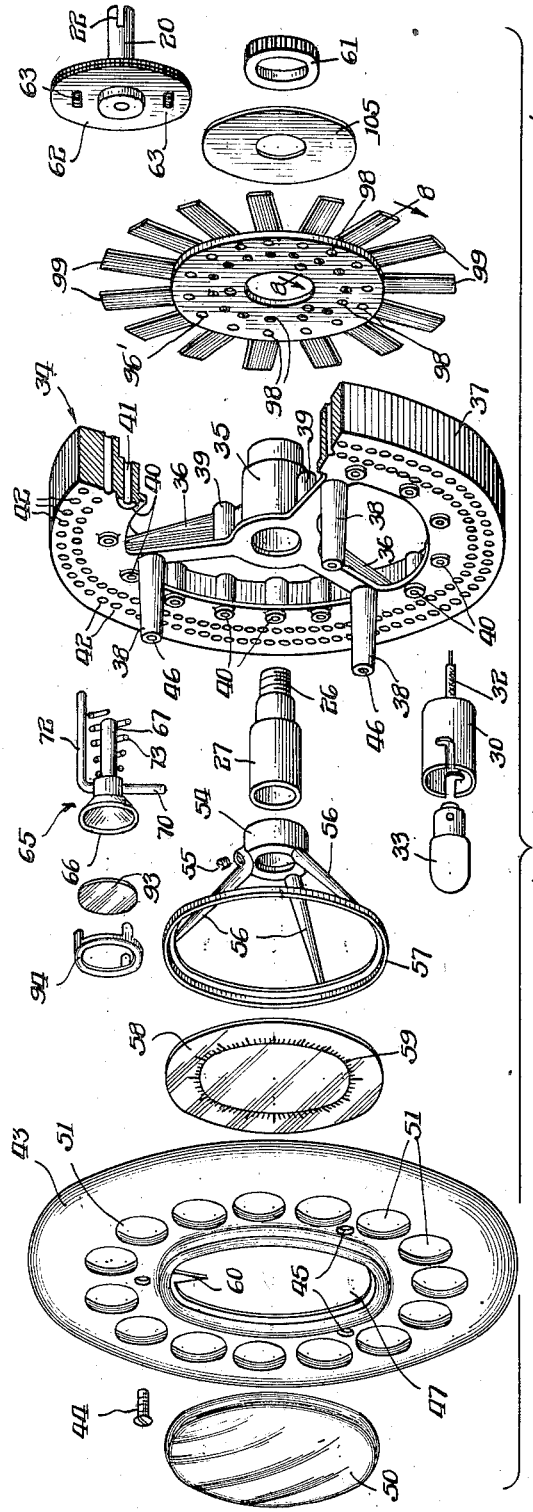
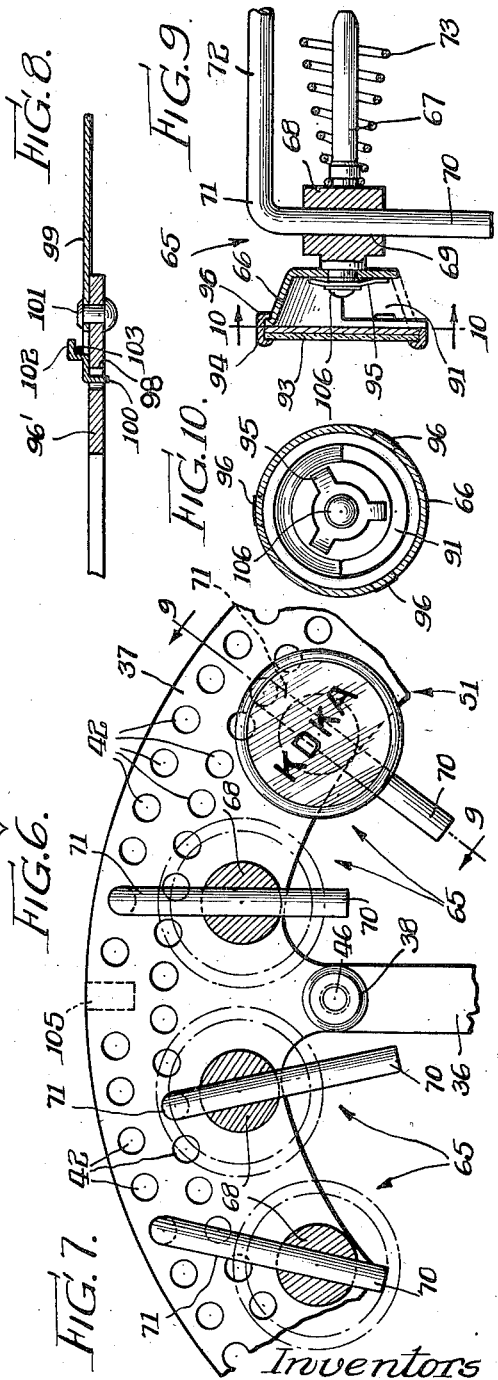
Inventors
Mahlon W. Kenney
Andrew A. Gedde
By: Cox & Moore attys.

Patented Jan. 2, 1940

2,185,407

UNITED STATES PATENT OFFICE 2,185,407

SELECTIVELY OPERABLE AUTOMATIC ADJUSTING MEANS

Mahlon W. Kenney, Oak Park, and Andrew A. Gedde, Chicago, Ill.

Application September 10, 1936, Serial No. 100,156

12 Claims. (Cl. 74—10)

This invention relates in general to adjusting apparatus and has more particular reference to apparatus for adjusting radio receivers and similar equipment.

An important object is to provide improved selector means manually operable for the purpose of adjustment, and functioning automatically to stop in any selected one of a number of adjusted positions; a further object being to provide a further adjustment whereby the selected stopping position may be varied within a limited range in order that the device may be conditioned to stop in an exact predetermined position within the range.

Another important object is to provide adjusting means, including means to stop the same automatically when any selected one of a number of adjusted positions is reached, including indicator means for showing the instantaneous position of the adjusting means throughout its operating range; a further object being to provide the adjusting means with selector elements manually operable to determine the selected stopping position of the device and to provide means for illuminating the indicator and the selector elements in order to facilitate operation of the device in the absence of external illumination.

Another important object is to provide adjusting means having selector buttons operable to determine a pre-selected position of adjustment, including means forming a part of the device for illuminating the buttons in order to facilitate operation of the same in the absence of external illumination; a further object being to utilize a lamp in such devices mounted in position to shine upon the buttons rearwardly of the faces of the same, and to form the buttons to permit rearward illumination of the faces thereof.

Another important object is to provide a selector button having an indicia plate supported on a cup-shaped base, whereby the button may be supported with its indicia plate facing a desired direction, the indicia plate being translucent and the cup-shaped base being formed to permit rearward illumination of the plate; a further object being to form the base as a sheet-metal stamping having a part of the side walls thereof cut away to permit illumination of the interior of the base rearwardly of the indicia plate; and a still further object being to form the base alternately of translucent material, such as Celluloid or Pyralin, whereby the back of the indicia plate may be illuminated through the material of the base.

Another important object is to provide means in the form of a rotatable dial adapted to be twirled manually, including means manually operable as a part of the twirling action of the dial to stop the twirling means in a selected adjusted position; a further object being to provide means to stop the adjusting apparatus in a desired position regardless of the direction of dial twirling movement.

Another important object is to provide means operable during the twirling movement of the dial to render inactive the apparatus being adjusted by the adjusting means, so that where this means is applied for the purpose of adjusting or tuning a radio receiver, the unpleasant and undesirable "blurpy" sounds, caused by rapid adjustment of the receiver successively through a plurality of tuned positions, may be eliminated by rendering the receiver inactive during the adjusting period.

Another important object is to provide adjustable tuning means for radio receivers, including means operable automatically to quiet the receiver as the adjustment thereof is commenced, whereby the receiver may be silenced and remain inactive during the adjusting operation, emitting no sound whatever until the adjusting operation is completed, at which instant the receiver becomes active in the new adjusted position.

Another important object is to provide selective adjusting apparatus particularly adapted for use in adjusting vehicle-mounted radio receivers, the adjusting device including a preferably annular selector dial having a series of spaced openings formed in the dial for the reception of the finger of an operator to facilitate twirling of the dial for the purpose of adjustment, each of the openings having a button therein depressible by insertion of the finger of the operator in the opening as a part of the adjusting operation, the button controlling a stop device which functions to stop the twirling movement of the dial when the adjusted position corresponding with the selected stop is reached.

Another important object is to arrange a stationary indicator dial having a graduated scale in position within the annular selector dial and to provide the twirlable selector dial with an index or pointer to indicate on the stationary dial the adjusted position of the apparatus; a further object being to provide a lamp mounted preferably at the axis of rotation of the selector dial in position behind the graduated indicator dial to illuminate the same.

Another important object is to provide a device of the character mentioned comprising a preferably cylindrical casing having an open top and an axle extending axially within the cylindrical casing and secured centrally on an end thereof, the axle forming a support for twirlable means including a support spider journalled on the axle and providing an annular rim for mounting a plurality of selector buttons, including associated stop means controlled by the selector buttons, the stop means being normally held in restricted position and being shiftable upon depression of the selector buttons on the spider into stopping position adapted to engage cooperating means carried on the housing.

Another important object is to mount the annular twirlable selector dial on the spider in position such that the selector dial forms a cover for the open end of the housing, whereby all of the operating parts of the mechanism are enclosed within the housing and the cover which is formed by the twirlable annular selector dial.

Another important object is to utilize the stationary axle as a means for mounting a lamp within the housing and behind a graduated indicator dial which is mounted in an opening formed centrally of the selector dial.

Another important object is to mount the graduated indicator dial in a frame which in turn is mounted on the stationary axle.

Another important object is to provide geared means for drivingly connecting the rotatable or twirlable parts of the adjusting apparatus with a preferably flexible power transmission element which in turn is or may be connected with a device such as a radio receiver to be controlled; a further object being to utilize means eliminating backlash between the adjusting mechanism and the device controlled thereby.

Another important object is to form the spider, which is rotatable upon the stationary axle within the casing, as an index plate in which the button-controlled stop means may be set or adjusted to vary, within limits, the stopping positions controlled by the several buttons.

Another important object is to provide a selector mechanism in which the operating range of the turnable selector dial is a complete revolution of the dial; a further object being to provide suitable driving means between the adjusting mechanism and the device controlled thereby so that the controlled device may turn through a fractional revolution while the adjusting device is turning through a complete revolution, thereby permitting maximum efficiency where the adjusting device is applied for the controlling of an adjustable apparatus in which the range of adjustment is less than a complete revolution, as for example a radio receiver in which the tuning condensers have an adjustable range of 180 degrees.

Another important object is to provide switch means operable as the adjusting device reaches adjusted position for affecting the device which is controlled by the adjustable apparatus, as the same reaches a selected adjusted position, this phase of the invention relating more particularly to a switch for rendering inactive the automatic frequency control circuit of a radio receiver as the receiver reaches tuned position in order that a precision adjustment may be accomplished.

Another important object is to provide an especially compact arrangement of parts forming adjusting means which, while having general utility, is particularly well adapted for the control of radio receivers in vehicles, more especially automobile vehicles, the adjusting means providing for automatic adjustment to any selected one of a number of adjusted positions and being particularly well suited for mounting on the instrument panel of the vehicle, the several parts of the adjusting device to this end being arranged neatly and compactly within a preferably cylindrical housing, thereby occupying a minimum amount of space; and a still further object is to form the mechanism so that the adjusting device has an operating range embracing 360 degrees, thereby utilizing the available space at maximum efficiency.

These and numerous other important objects, advantages and inherent functions of the invention will become apparent as the same is more fully understood from the following description which, taken in connection with the accompanying drawings, discloses a preferred form of the invention.

Referring to the drawings:

Figure 1 is a perspective view of a selective adjusting device embodying the present invention;

Figure 2 is a sectional view taken substantially along the line 2—2 in Figure 1;

Figures 3 and 4 are sectional views respectively taken substantially along the line 3—3 in Figure 2 and along the line 4—4 in Figure 3;

Figure 5 is a sectional view taken through a selector element which may form a part of the mechanism shown in Figure 2;

Figure 6 is an exploded perspective view of parts forming the apparatus illustrated in Figure 2;

Figure 7 is an enlarged sectional view taken substantially along the line 7—7 in Figure 2;

Figure 8 is a sectional view taken substantially along the line 8—8 in Figure 6;

Figure 9 is a sectional view, taken along line 9—9 of Figure 6, of a selector element which may form a part of the mechanism shown in Figure 2; and Figure 10 is a sectional view taken substantially along the line 10—10 in Figure 9.

To illustrate the invention, we have shown in the drawings an adjusting device 11 particularly adapted for use in adjusting radio receivers, although it will be apparent that the present invention is not necessarily restricted to the adjustment of radio receivers, but may be applied wherever it is desired to accomplish the adjustment of adjustable equipment. The present invention, however, relates to means manually operable to turn the adjustable device to any one of a number of predetermined adjusted positions and to stop the same when a selected position of adjustment is reached, and the device includes means whereby the exact position of stoppage may be varied or adjusted between limits so that the apparatus may be calibrated or indexed, for every position of adjustment to which it may be automatically set; that is to say, the apparatus may be regulated to cause stoppage exactly at a desired adjusted position within a predetermined range.

To this end the adjusting means 11 comprises a main frame 13 (Figures 1 and 2), preferably formed as a casing having cylindrical walls 14 and a closed end 16. The casing or housing 13 forms an enclosure within which adjustable apparatus is mounted and assembled. The housing 13 may of course be provided with means for attaching the same in mounted position, as on the instrument panel of an automobile, where the device is applied for the purpose of controlling or adjusting a vehicle-mounted radio receiver. The casing 13 may be formed in any suitable or convenient fashion, and we prefer to fabricate the same as a metallic die casting so that the side and end walls 14 and 16 are integral. In addition, the end wall is preferably formed with a central opening 17 (Figure 2), defined by an embossment 18, and a sleeve-like portion 19 forming a journal for a stub shaft 20 having an end 21 extending within the housing 13, and an end, preferably splined as at 22, within the sleeve 19 for connection with a flexible shaft or other transmission means 23 which may extend to and from driving connection with the device to be controlled by the adjustable mechanism 11. The present invention specifically contemplates that the control device with which the transmission element 23 is drivingly connected shall be a radio receiver which of course may be located remotely from the adjusting mechanism 11, as is usually necessary where the receiver is mounted in a vehicle such as an automobile. It will be obvious, however, that the invention is not necessarily restricted to the remote control of radio receivers; on the contrary, the adjustable mechanism may be assembled directly on the apparatus to be controlled and in many cases may be directly connected therewith.

The end wall 16 of the casing may also be provided with one or more openings 24, preferably defined by embossments, and through which openings electrical conductors 24' may extend into the casing for purposes hereinafter more fully described. The embossment 18, the sleeve 19 and the embossments defining the openings 24 may be interconnected by ribs 25 preferably extending radially of the embossment 18 to the edges of the wall 16 for the purpose of strengthening the same. The opening 17 receves an end 26 of an axle element 27 (Figures 2 and 6) which extends within the housing, element 27 having a shoulder engaging the inner face of the embossment 18 and the end 26 being threaded outwardly of the embossment to receive a holding nut 28 (Figure 2) by means of which the axle element 27 may be firmly and securely anchored on the end wall 16 in position extending within the casing 13. The inner end of the axle element is formed with a cavity 29 in which is mounted a lamp socket or base 30, and the axle 27 is channeled as at 31 to receive a cable 32 which extends in the channel and is electrically connected with the lamp socket 30, the cable extending outwardly of the casing through the end 26 of the axle element so that a lamp 33 mounted in the socket 30 in position projecting from the inner end of the axle element 27, within the housing 13, may be energized from any suitable external source of electric power.

The axle element 27 within the housing 13 forms a journal for rotatably supporting a frame or spider 34 (Figures 2 and 6), comprising a central hub 35, arms 36 radiating from the hub, and an annular rim 37 connected to the outer ends of the radiating arms. On one side the spider is formed pedestals 38, which extend outwardly of the spider substantially at the ends of the arms 36, and arms 36 are formed with embossments 39 near the hub 35. The rim 37 is provided with a plurality of embossments 40 defining channels 41 extending through the rim in substantially equally spaced relationship, there being in the illustrated embodiment fifteen of the channels 41 disposed circularly about the axis of the spider. The rim 37 is also provided with a plurality of indexing channels, preferably arranged in spaced relationship in the rim, there being, in the illustrated embodiment, two concentric rows of channels 42. The channels of each row are equally spaced around the rim of the spider, while the channels of one row are spaced between the channels of the other, for a purpose hereinafter more fully described.

A selector dial 43 (Figures 1, 2 and 6) is secured upon the outer ends of the pedestals 38 in any suitable fashion, as by means of the fastening screws 44 (Figure 6) which penetrate perforations 45 formed in the selector plate, and thread into openings 46 formed axially in the ends of the pedestals 38. The selector dial 43 is provided with a central opening 47 defined by an annular bead or protrusion 48 (Figure 2) and a flange 49 extending inwardly of the bead, the flange and bead forming a seat or socket for receiving a transparent window element 50 (Figures 2 and 6) for the purpose of closing the opening against the entrance of foreign matter. Outwardly of the bead 48 the selector dial is provided with a plurality of openings 51, each defined by an inwardly extending annular flange 52 (Figure 2), these openings being preferably of a size sufficient to receive the finger of a person for the purpose of operating the adjusting mechanism; in the illustrated embodiment there are fifteen openings 51 corresponding respectively with the fifteen channels 41 of the spider 34. Outwardly of the circularly arranged openings 51 the selector dial is formed with an inwardly curled edge 53 adapted to embrace the side walls 14 of the housing at the open end thereof, whereby the selector plate forms a cover for the housing.

The spider 34 is retained in place on the axle element 27 by means of a holding collar 54 (Figures 2 and 6) secured on the inner end of the axle element 27 opposite one end of the spider hub 35, the other end of the hub abutting the inner surface of the wall 16. The holding element 54 may be secured in place on the end of the axle element by means of a set screw 55, and the holding element is annular so that the lamp 33 may extend therethrough. The holding element 54 likewise is formed with radially extending arms 56 having ends projecting forwardly of the lamp 33 and carrying a preferably annular rim 57 substantially opposite the annular bead 48 of the selector dial 43. This rim 57 forms an annular seat for receiving the edges of a circular dial plate 58, which is preferably of translucent material such as Pyralin or Celluloid, and is secured to the rim 57 in any suitable fashion, as by riveting the parts in place. The plate 58 is preferably translucent and is displayed opposite the opening 47, in position visible through the window element 50. The plate carries indicia forming preferably a graduated scale 59 (Figures 1 and 6) which may be calibrated to indicate the position of the adjusting mechanism in any suitable terms, and preferably in terms of the corresponding position of the adjustable device with which the adjusting mechanism 11 is operatively associated and connected. Where the adjusting mechanism 11 is utilized for the control of a radio receiver, the scale 59 may be graduated in terms of wavelength or frequency, for the purpose of illustrating the tuned condition of the radio receiver.

The plate 58 in the illustrated embodiment is, of course, stationary, since it is rigidly mounted on the axle element 27, and to indicate the adjusted position of the mechanism 11 and the controlled receiver or other device with which the adjusting mechanism is operatively associated, the selector dial 43 is preferably provided with an index finger or pointer 60, preferably comprising a tongue extending in the opening 47 and formed integral with the selector dial. By making the indicator dial 58 of translucent material, the same may be rendered highly visible in the absence of external illumination by energizing the lamp 33.

The hub of the spider carries a driving pinion 61 (Figures 2 and 6) in position to drivingly engage a gear 62 which is secured to the inner end 21 of the stub shaft 20 so that rotation of the spider on the axle element 27 may be translated through the gears 61 and 62 and cause rotation of the flexible shaft 23 and consequent movement of the control device with which the shaft 23 is drivingly connected. The controlled device thus may be adjusted by rotating the spider on the axle element 27, the adjustment accomplished in the controlled device being proportional to the movement of the spider. The gear 61 of course may be fixed on the hub of the spider in any suitable fashion, as by splining, and the gear 62 preferably comprises a pair of gear plates, one of which is rigidly fastened to the stub shaft 20 and the other of which is shiftable on the shaft. The two gear plates forming the gear 62 are normally spring-urged by means of the springs 63 (Figure 6) in order to eliminate backlash between the pinion 61 and the gear 62.

Adjustment of the device drivingly connected with the transmission element 23 may be accomplished by turning the selector dial 43. This may be accomplished manually by an operator by inserting the fingers in one or more of the openings 51. The amount of adjustment may be gauged on the scale 59 by observing the position of the index finger 60 with respect to the scale.

However, to facilitate adjustment, we prefer means automatically operable during the adjusting movement of the selector dial to stop the adjusting mechanism at a predetermined selected position. In the illustrated embodiment, the selector means comprises a plurality of button-controlled stop elements 65 (Figures 2, 5, 6, 7 and 9) carried on and by the rim 37 of the spider 34. These selector elements preferably each comprise a push button portion 66 and a stem 67 adapted for mounting in the channels 41 of the spider in position to support the button portion 65 opposite the corresponding opening 51 of the selector dial. Adjacent the button portion 66 the stem is formed with an enlargement 68 (Figures 5, 7 and 9) having a preferably diametral bore 69 (Figure 9) adapted to slidingly receive an end 70 of a stop element 71 (Figures 2, 5, 6, 7 and 9), preferably comprising a metal rod bent intermediate its ends to provide the portion 70 and a portion 72 extending substantially at right angles with respect to the portion 70. When the portion 70 is mounted in the diametral opening 69, the portion 72 may be assembled in any one of a number of the channels 42 which are in the vicinity of the channel 41 in which the stem 67 is mounted. Thus it is that the stop element may be adjusted so that the portion 72 thereof may occupy any desired one of a plurality of angulated positions circumferentially of the spider, and the fineness of adjustment is of course determined by the number of openings 42 and the angular spacement thereof on the rim of the spider with respect to the axis of the spider. By multiplying the number of openings 42, the angular distance between adjacent openings may be almost indefinitely reduced to afford a substantially infinite number of adjusted positions in which the portion 72 of the stop element may be assembled. In the illustrated embodiment fifteen stop assemblies 65, one for each of the openings 41, may be assembled on the spider. A spring 73 is assembled around the stem 67, being preferably secured to the stem by crimping an end thereof in a groove formed in the stem adjacent the enlargement 68. The opposite end of the spring is adapted to seat on the face of the spider rim 37 around the embossment 40 which defines the channel 41 in which the stem 67 is assembled. The spring 73 is adapted to normally urge the assembly 65 in a direction to press the button 66 toward the selector dial, the peripheral edge of the button being adapted normally to engage snugly upon the annular rim 52 defining the finger opening 51 of the dial as shown in Figure 2. The face of the button is thus normally exposed in the opening 51, in position such that insertion of a finger through the opening will depress the button assembly 65 on the spider against the opposing force of the spring. When the button assembly is thus depressed, the end of the portion 72 will be projected from a position substantially within the body of the spider rim, as shown at 74 in Figure 2 of the drawings, to a position projecting from the rim, substantially as shown at 75 in Figure 2 of the drawings. When the pin 72 is in the projected position shown at 75, it is adapted to engage a stop pin 76 (Figures 2 and 3) mounted on the frame 13, whereas said pin 72 when in the normal retracted position as shown at 74 cannot engage the cooperating frame-mounted stop pin 76.

It will be seen, therefore, that by inserting a finger in a selected one of the openings 51 of the selector dial, the dial and also the spider may be easily rotated in either direction. Insertion of a finger in a selected opening, in order thus to turn the adjustable assembly, will cause projection of the corresponding stop element 72 into position such that when the rotating assembly has moved to a predetermined position, the pin 72 will engage the stop element 76, whereupon further turning of the rotatable assembly will be stopped automatically in a selected adjusted position. By properly indexing the pin 72 in a desired one of the several available openings 42 in the vicinity of the opening 41, it will be seen that stoppage of the assembly may be accomplished in any exact desired position within a limited range in either direction from the stem 67.

We desire, however, to insure that stoppage of the mechanism is accomplished at the same relative position with respect to the frame regardless of the direction in which the pin 72 approaches the stop element 76. If the stop pin 76 is made rigid on the frame 13, it will be seen that the shiftable assembly will not be stopped in the same position, but the stopping position, when the device is turned in one direction, will be displaced from the corresponding position of stoppage accomplished by turning the device in the other direction, by a distance equal to the sum of the diameters of the pins 72 and 76. The pin 76, therefore, is supported with its axis lying in the plane in which stoppage of the pin 72 is desired when adjusted position is reached. To this end the pin 76 is mounted in a bracket or frame 77 (Figures 2, 3 and 4) which in turn is tiltably mounted on the frame 13, the bracket 77 being pivoted on a stem 78 (Figure 2) which is fastened, as by riveting or otherwise, in an extension 79 of the housing 13. The pin 76 is mounted at one end in the frame 77 and at its other end extends in an elongated slot 80 (Figure 4) formed in the frame 13, preferably in the cylindrical side walls 14 thereof. This slot 80 is elongated so that its opposed ends will form stops for limiting the movement of the pin 76 in either direction from its neutral or normal position so that the pin 76 may be displaced from neutral position a distance in either direction equal to one-half the combined diameters of the pins 72 and 76, whereby the rotatable assembly may be stopped when a depressed pin 72 reaches a position in which its axis occupies the plane in which the axis of the pin 76 normally extends when said pin 76 is in neutral position.

We also prefer to provide an extension 81 (Figures 2 and 3) on the frame 77 and cooperating spring-pressed means 82 (Figures 3 and 4) bearing upon the extension 81 to normally maintain the frame 77 in a neutral position, and while any means may be employed to hold the frame resiliently in such neutral position, we prefer to provide a cam-like element 82 forming a V-shaped track and normally urged in such a manner that the frame extension 81 seeks the bottom of the V-shaped track. The element 82 to this end may comprise a strip of resilient material adapted to form one arm 83 of a switch element, the other arm 84 of which is supported in position such that cooperating contacts 85 on the arms 83 and 84 will be open and separated when the frame 77 is in its neutral position, that is to say, when the extension 81 is in the bottom of the notch provided in the element 82. As soon as the frame 77 is displaced in either direction from its normal position, as by engagement of a projected pin 72 with the stop pin 76, the projection 81 riding upon the sides of the V-shaped cam element 82 may cause closure of the contacts 85. The switch arms 83 and 84, as shown at 87 (Figure 4), may be relatively insulated and insulated from the wall of the frame 13 on which they are mounted, the wall being provided with an embossment 88 on which the switch arms may be secured, as by means of the fastening elements 89. Suitable means, for example a cable 90 (Figure 1), may be provided for connecting one of the switch elements, preferably the arm 84, with the device controlled by the mechanism 11, the other arm 83 being grounded to the frame 13 through the electrical connection provided by engagement of the plate 83 with the frame 77 and thence to the housing 13. The cable 90 may be conducted from the housing through one of the openings 24 and, where the device 11 is utilized in controlling a radio receiver, the conductor 90 may be connected with the automatic frequency control circuit of the receiver, so that this circuit may be grounded and rendered inactive at the instant the controlled device reaches adjusted position, that is to say, when the pin 76 is displaced by the projecting pin 72. It is desirable thus to inactivate the automatic frequency control circuit of the receiver containing the same at the instant of adjustment, in order thus to exclude interference from powerful stations having a carrier frequency near the frequency of the station to which the receiver has been adjusted. Of course the switch 85 may be utilized to accomplish any other control function upon the controlled device which may be desired at the instant the device reaches adjusted position.

The button portion 66 of the depressible selector assembly 65 (Figures 2, 5, 6, 9 and 10) may have any suitable or preferred form and may comprise a cup-shaped element secured to the end of the stem 67 as by riveting or other suitable fastening expedient. The cup-shaped element 66 may be formed as a sheet metal stamping, and if so, we prefer to cut out a portion of the side of the same, as shown at 91 (Figures 9 and 10), whereby light rays from the lamp 33 or other source of illumination may penetrate within the element 66, and we prefer to mount a preferably translucent indicia plate 93 (Figures 5 and 9), which is preferably circular, with the edges of the plate 93 seated upon the rim of the cup-shaped element 66; the plate or plates 93 may carry indicia indicating the adjusted position controlled by the depressible assembly 65 in which it is mounted and of which it forms a part. Any suitable means may be utilized to secure the plate or plates 93 upon the cup-shaped element 66, but we prefer to employ a preferably sheet-metal rim 94 (Figures 2 and 9) having lugs 96 (Figures 9 and 10) adapted to be bent over the rim of the cup-shaped element 66 in order to secure the plates 93 in place. Alternately the cup-shaped element 66, as shown in Figure 5, may be formed entirely of translucent material such as pyralin, Celluloid and like material having adequate strength to function as a push-button element. By forming the element 66 of translucent material, or by providing the opening 91 where the element 66 is of sheet metal or other opaque material, light rays from the lamp 33 or other source of illumination within the casing 13 are permitted to penetrate within the head of the push button and illuminate the indicia-carrying plate or plates 93 from behind in order to render the same highly visible, thus facilitating selection and operation of the device in the absence of external illumination.

We also prefer to mount the head of the push button rotatably upon the stem 67 in order to permit the head to be twisted on the stem after the same and the stop element 72 have been assembled in indexed position on the spider, thus permitting the indicia of the button to be oriented with respect to the selector dial, to place the same in most readily readable position without removing the holding rim 94 and laboriously turning the indicia plate or plates on the shell-like element 66. To this end we prefer to include a spring-like washer 95 (Figures 9 and 10) in the fastening in order to hold the button head 66 resiliently against turning on the steam 67.

In adjusting radio receiving apparatus for the tuning of the same, where the tuning operation involves the rapid movement of the adjustable portions of the receiver through a plurality of tuned-station receiving positions before reaching the desired tuned position, the receiver may instantaneously emit "blurpy" sounds in passing through the several station receiving positions, and this condition is somewhat undesirable. We propose to eliminate the same by incorporating switching means automatically operable when any one of the assemblies 65 is depressed on the spider to render the controlled receiver inoperative during automatic tuning. To this end we provide switch means operable upon depression of any of the button assemblies 65 to render the receiver inactive until the button is released at the completion of the automatic tuning operation. In the illustrated embodiment, this receiver-quieting switch means comprises a plate 96' (Figures 2, 6 and 8) of preferably insulating material secured upon the bosses 39 by means of set screws 97 (Figure 2) or other suitable fastening means, the plate 96' having an opening through which the hub 35 of the spider extends, and a plurality of openings 98 (Figure 6) by means of which preferably sheet-metal strips 99 (Figures 2, 6 and 8) may be mounted on the plate 96 in position extending radially outwardly of the rim thereof in position underlying the ends of the stem 67. In the illustrated embodiment, fifteen strips 99 are shown, there being one strip for each of the fifteen push-button assemblies. These strips have each a lug 100 (Figure 8) adapted to engage in one of the openings 98 of the plate, and each strip is fastened to the plate by means of a rivet 101, or other suitable fastening member, extending in another of the openings 98. Each strip also has a struck-out portion 102 forming a clip. The clips 102 of all of the strips 99 collectively form an annular way in which an electrical conductor 103 may be secured in order to electrically connect all of the strips 99. The conductor 103 is or may be electrically connected in any suitable fashion with an electrical cable 104 (Figures 1 and 2), which is preferably insulated and wound in loose coils around the hub 35 of the spider, the cable being conducted out of the housing through one of the openings 24 and connected with the radio receiver or other device controlled by the adjusting mechanism 11, the cable, where the device 11 is operatively connected for the control of a radio receiver, being arranged to silence the receiver whenever the same is connected to ground by the engagement of a stem 67 with a blade 99 upon depression of the corresponding push-button assembly. The cable 104 of course is loosely wrapped about the hub 35 in order to compensate for the winding and unwinding effect on the cable caused by rotation of the spider during tuning operations. We also provide a disk 105 (Figures 2 and 6) which is mounted on the hub 35 adjacent the gear 61 in order to prevent the cable 104 from becoming caught between the gears 61 and 62 and thus damaged. Obviously the switching means provided by the blades 99 and cooperating ends of the stems 67 may be produced in any other fashion. For example, the blades 99 may be formed as projections in an integral plate of conducting material secured on and insulated from the spider in any suitable fashion.

It will be noted that the adjusting range of the mechanism 15 embraces substantially one complete revolution of the spider on the axle element 27, and where the controlled device is a radio receiver tunable by turning tuning condensers through 180 degrees, the ratio of the pinion and gear 62 will be a ratio of two to one in order to accomplish the necessary room reduction. The arrangement of the parts, however, permitting the utilization of one complete revolution of the spider, permits the production of an extremely neat and compact adjusting mechanism which may be housed in a casing having a diameter of five inches or less, so that the same is well adapted for mounting in the restricted space available on the instrument panel of an automotive vehicle.

One of the important features of the present invention resides in the construction utilizing a selector dial turnable through a complete rotation in combination with a stationary indexing dial disposed centrally of the selector dial. It will be noted that the construction and arrangement of the mechanism illustrated is such that the indicator dial 58 (Figures 2 and 6) remains stationary at all times while the selector mechanism may be rotated freely through 360 degrees, rotation of the selector mechanism in either direction being limited by the stop projection 106 on the frame 34, which extends in a position to engage the stop pin 76 when the selector reaches the limits of its rotary movement in either direction on the axle 27.

The compactness resulting from the novel arrangement of the operating parts is an important feature of the present invention, enabling as it does the provision of apparatus which may be utilized in small available space, thus making the equipment especially desirable for the control of vehicle-mounted radio receivers, although the invention may have application wherever it is desired to provide for automatic adjustment.

It is thought that the invention and numerous of its attendant advantages will be understood from the foregoing description, and it is obvious that numerous changes may be made in the form, construction and arrangement of the several parts of the illustrated apparatus without departing from the spirit or scope of the invention or sacrificing its attendant advantages, the preferred modes and forms herein described being merely for the purpose of illustrating the invention.

Having thus described our invention, what we claim as new and desire to secure by Letters Patent, is as follows:

1. Selective adjusting mechanism comprising a manually shiftable element, selectively operable means carried by said manually shiftable element, said selective means comprising a plurality of independent selectors, and a stop element mounted on each of said selectors for movement therewith and relative thereto, each of said stop elements having a portion adjustably connected with said manually shiftable element for adjustment of said stop element relative to said shiftable element within limits to set the mechanism for stoppage at any one of a plurality of possible positions within the range of the selectors, and means selectively cooperating with an operated stop element to stop the manually shiftable element in a predetermined adjusted position which is independent of the direction of movement of said shiftable element.

2. Selective adjusting mechanism as set forth in claim 1 including geared means for connecting the manually shiftable element with an adjustable apparatus to be controlled whereby the adjustable apparatus may be shifted in proportion to the movement of the manually shiftable element.

3. Selective adjusting mechanism as set forth in claim 1 wherein said manually shiftable element comprises a rotatable wheel and geared means connecting said wheel with an adjustable apparatus to be controlled by said mechanism, said geared means having a ratio such that the controlled apparatus may be moved throughout its adjustable limits in response to one complete rotation of said wheel.

4. Selective adjusting mechanism as set forth in claim 1 wherein said manually shiftable element comprises a rotatable wheel and geared means connecting said wheel with an adjustable apparatus to be controlled by said mechanism, said geared means having a ratio such that the controlled apparatus may be moved throughout its adjustable limits in response to one complete rotation of said wheel, and means on said wheel to prevent rotation thereof through more than one complete rotation in either direction.

5. Selective adjusting mechanism as set forth in claim 1 wherein the manually shiftable element comprises a rotatable wheel, a stationary axle upon which said wheel is journaled, means forming a stationary indicator dial concentric with the selectors and index means carried by said wheel in position to cooperate with said indicator dial for indicating the adjusted position of said wheel.

6. Selective adjusting mechanism as set forth in claim 1 wherein the manually shiftable element comprises a rotatable wheel, a stationary axle upon which said wheel is journaled, means forming a stationary indicator dial concentric with the selectors and index means carried by said wheel in position to cooperate with said indicator dial for indicating the adjusted position of said wheel, and means carried by said axle for illuminating said indicating dial.

7. Selective adjusting mechanism as set forth in claim 1 wherein the manually shiftable element comprises a rotatable wheel, a stationary axle upon which said wheel is journaled means forming a stationary indicator dial concentric with the selectors and index means carried by said wheel in position to cooperate with said indicator dial for indicating the adjusted position of said wheel, and a lamp on said axle in position behind said indicating dial to illuminate the same.

8. Selective adjusting mechanism as set forth in claim 1 wherein the manually shiftable element comprises a rotatable wheel, a stationary axle upon which said wheel is journaled means forming a stationary indicator dial concentric with the selectors and index means carried by said wheel in position to cooperate with said indicator dial for indicating the adjusted position of said wheel, and a lamp on said axle in position behind said indicating dial to illuminate the same, said selectors comprising depressible buttons, indicia means on said buttons for indicating the adjusted position of the mechanism controlled by the selectors, said buttons being formed and supported in position to be illuminated by said axle-supported lamp.

9. Selective adjusting mechanism comprising, a stationary axle, a wheel manually turnable on the stationary axle, a lamp carried by said axle, and selectors comprising a plurality of stems depressible on the rim of the wheel into position to engage a relatively fixed stop for the purpose of stopping rotation of the wheel in adjusted position, said stems each carrying a push button comprising a shell on the stem and a translucent plate forming a cover for the shell, said shells being formed to admit light therein from the lamp carried by said axle whereby to illuminate said translucent covers and render identifying indicia thereon highly visible in the absence of external illumination.

10. In a tuning control for radio receivers or the like having a tunable element, a manually operable rotor, supporting means upon which said rotor is journaled, said rotor having a plurality of angularly spaced openings, a plurality of selectively operable push buttons slidably mounted in said openings, each of said push buttons having a portion to receive indicia representative of a selected broadcasting station and a light-transmitting portion rearwardly of said indicia-receiving portion, an indicating dial mounted on said supporting means, a face plate secured to said rotor, said face plate having a plurality of finger-receiving openings aligned with said selectively operable push buttons and a light-transmitting portion in alignment with said indicating dial, luminous means carried by said supporting means for illuminating said indicating dial and cooperating with the light-transmitting portions of said push buttons to illuminate the indicia carried thereby, and means cooperating with said selectively operable push buttons to stop said rotor in predetermined adjusted positions selectively to tune said receiver to the stations represented by the indicia carried by said push buttons.

11. In a tuning control for radio receivers or the like having a tunable element, a manually operable rotor, means connecting said rotor to said tunable element, said rotor having a series of angularly spaced openings and a plurality of additional angularly spaced openings, said additional openings being concentric with said first series of openings, a plurality of selectively operable push buttons slidably mounted in each of said series of openings, a plurality of stop elements mounted on said push buttons for operation thereby, each of said stop elements having a portion slidably connected to one of said push buttons and a portion at right angles to said first portion and slidably received in a selected one of said additional openings, a stationary supporting member, and means having a predetermined movement relative to said stationary member and cooperating with said stop elements for selectively stopping said rotor and said tuning element in predetermined adjusted positions independent of the direction of rotation of said rotor.

12. In a tuning control for radio receivers or the like having a tunable element, a manually operable rotor, fixed supporting means upon which said rotor is journaled, said rotor having a plurality of angularly spaced openings, a plurality of selectively operable push buttons slidably mounted in said openings, each of said push buttons having a portion to receive indicia representative of a selected broadcasting station and a light-transmitting portion rearwardly of said indicia-receiving portion, luminous means carried by said supporting means and cooperating with the light-transmitting portions of said push buttons to illuminate the indicia carried thereby, and means cooperating with said selectively operable push buttons to stop said rotor in predetermined adjusted positions selectively to tune said receiver to the stations represented by the indicia carried by said push buttons.

MAHLON W. KENNEY.
ANDREW A. GEDDE.